Aug. 25, 1959  A. W. JURRAS  2,901,455
MOLDING COMPOSITION COMPRISING SYNTHETIC RESIN
AND METALLIC FILAMENTS, ARTICLES MOLDED
THEREFROM AND METHOD OF MAKING SAME
Filed Aug. 9, 1954
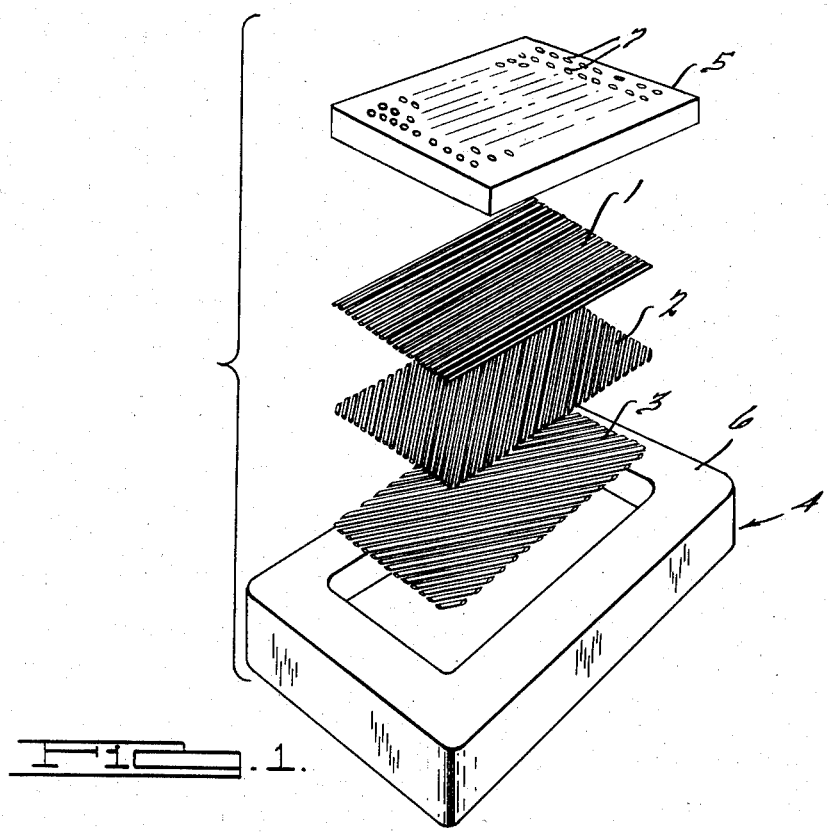
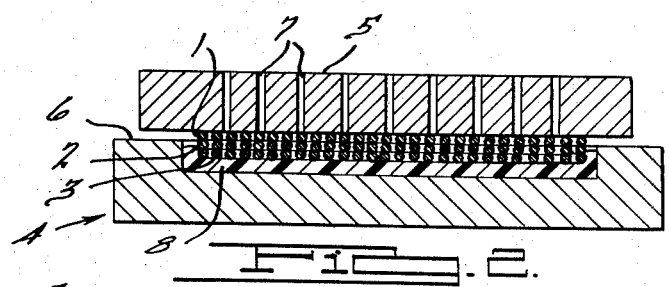
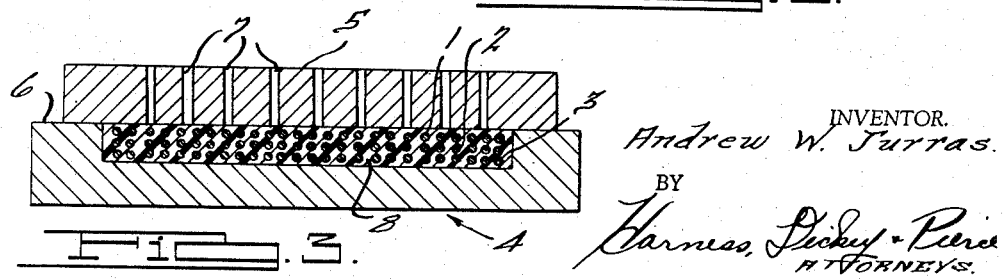
INVENTOR.
Andrew W. Jurras.
BY
Harness, Dickey & Pierce
ATTORNEYS.

United States Patent Office 2,901,455
Patented Aug. 25, 1959

2,901,455

MOLDING COMPOSITION COMPRISING SYNTHETIC RESIN AND METALLIC FILAMENTS, ARTICLES MOLDED THEREFROM AND METHOD OF MAKING SAME

Andrew W. Jurras, Detroit, Mich., assignor, by mesne assignments, to Union Carbide Corporation, New York, N.Y., a corporation of New York Application August 9, 1954, Serial No. 448,739

22 Claims. (Cl. 260—40)

The present invention relates to improved plastic compositions, articles made therefrom and the method of making such articles. More particularly, the invention relates to plastic molding compositions, method of molding same and plastic articles made thereby. Most specifically, the invention relates to epoxy and polyester resins which are modified to improve their thermal conductivity and impact resistance.

In the past, it has been extremely difficult to cast or mold sound articles of epoxy or polyester resins in thicknesses greater than about ½ inch because of the high degree of exothermic heat generated in the interior of thick masses during the curing reaction which creates high internal stresses in the cast or molded material. Many expedients have been devised to either curb or slow down the curing reaction or to control it in order to achieve sound castings or moldings. At best, these processes have not been successful commercially either because they do not actually control the reaction, or the means defeats the end, i.e. inferior product quality due to inhibition of cure, or because the processes are slow and involve too many complicated time-consuming steps for economical commercial operations.

In the production of molded plastic dies for the forming of metal, plastic, and other materials, the plastic mold sections must be extremely thick and massive, especially in the larger sizes of dies. Heretofore, these dies have been cast, molded or laminated from phenolic, epoxy or polyester resins. In the case of cast phenolic tools and dies, brittleness, poor abrasion resistance, poor shear and tensile strength, poor thermal conductivity have severely limited their commercial use for various tooling applications such as metal forming draw dies, heated dies for making fibre glass reinforced plastic laminates, molds for bag molding fibre glass reinforced plastic laminates, foundry patterns, core boxes, vacuum form molds and many other types of industrial tools. Epoxy resins in various forms have also been used for similar applications and prior to this invention have been extremely limited in their use because of the inability to cast or mold large castings without excess shrinkage and creating an excessive exothermic heat which would cause the casting to be porous and of very low strength. For these reasons commercial uses of epoxy resins to date have been limited to castings of around ½" in thickness and using a previously cast or fabricated core construction of various materials such as wood, metal, plaster or plastic to make up the greater mass of the tool or article being cast, or in other words using the epoxy resin as a facing material only. Much the same limitations as outlined above for epoxy resins apply to the use of polyester resins prior to this invention.

In accordance with the present invention, however, it has been found that a plastic composition comprising a mass of unwoven, continuous length metallic filaments such as steel wool, copper wool, silver wool or copper or silver coated steel wool, etc. impregnated with, or coated with, a polymerizable or thermosetting epoxy resin or polymerizable polyester may be molded to form articles of any desired thickness and having exceptional strength, thermal conductivity, impact resistance and other highly desirable properties. The thermal conductivity of the composition during cure is so high that heat is efficiently dissipated even from the thickness of cross sections with the result that completely sound moldings or castings are obtained without special precautions, in a relatively short time as compared to known processes and with a minimum of shrinkage and distortion. The molded articles moreover have good electrical conductivity, extremely good surface finish, and exceptionally good machining and working qualities.

By the term "unwoven continuous length metallic filaments" is meant a filler material comprising spun, extruded or cut metal filaments having a continuous length appreciably greater than that present in a finely chopped filamentary mass, or metal granules, or a metal powder. The filaments are not woven, that is, they are not twisted, plied up, or converted to fabric form. The preferred filler is the familiar metal or steel wool which is composed of a mass of unwoven more or less continuous metal filaments of steel, copper, aluminum, silver, etc. The filaments present in the unwoven wool type metals may satisfactorily have a diameter of between about 0.0005 and about 0.025 inch. While the filaments may be of any metal, it is preferred that they be of steel, iron, copper, silver, aluminum and their alloys. The only known restrictions on the metal forming the filaments is that it should be a good thermal conductor and have relatively high tensile and compressive strength.

The proportion of metal filaments in the composition may vary widely as long as sufficient metal is present to materially improve the thermal conductivity of the mass, on the lower end of the range, and on the upper end, as long as the proportion of resin is sufficient to knit the mass together upon curing to form a consolidated mass of good strength. In general, it has been found that at least 25% by weight of the total weight of plastic composition should comprise metal filaments in order to appreciably improve the thermal conductivity, strength, impact resistance and other properties. Except in special circumstances, it has been found that at least 20% of the composition should comprise the binder (i.e. 80% metal filament). More preferred is a range of metal filament content of from 35 to 75%.

In many instances, it is desirable to incorporate other fillers of both filamentary and finely-divided form, in order to further modify the molding properties, flow properties (in the mold) and other physical properties of the plastic composition. For this purpose up to two-thirds of the total filler content may comprise other added filler materials. Of course, it is to be understood that only in specialized applications can the actual proportion of continuous metal filaments be below 25% and even then it is preferred the proportion is not substantially below this figure. Illustrative fillers which may be employed for this purpose include metallic oxides such as aluminum oxide, glass fabric, glass fiber, silica, asbestos, fabric, chopped fabric, paper, clay such as kaolin, bentonite, and treated bentonites such as "Bentone," mica, metal powders, metal plated powders, and others, and resin-impregnated forms of these and other fillers, and others.

It also is sometimes desirable to incorporate in the composition other substances such as natural and synthetic resins and polymers, stabilizers, mold release agents or lubricants, plasticizers, dyes, colored pigments, and the like. The proportion of these materials to be incorporated will, of course, vary with the particular purpose and should be such as not to affect adversely the thermal conductivity of the composition in either its uncured or cured condition.

The resinous binder of the plastic molding composition of this invention is a catalyzed thermosetting or polymerizable resin selected from the class consisting of the thermosetting glycidyl ether polymers and the polymerizable polyhydric alcohol polycarboxylic acid polyesters. The glycidyl ether polymers are of the type formed by the catalyzed condensation of an epihalohydrin such as epichlorohydrin (1-chloro-2,3-epoxypropane) or epibromohydrin (1-bromo-2,3-epoxypropane) with another substance containing a plurality of reactive groups such as the hydroxyl (—OH) group. The most common form of the glycidyl ether polymers are the polymers of glycidyl ethers of polyhydroxy compounds such as are formed by the reaction of epichlorohydrin with a polyhydric alcohol such as diethylene glycol, etc. or with a polyhydroxy phenol such as "Bisphenol A" [2,2-bis(p-hydroxyphenyl) propane], resorcinol, an incompletely-condensed phenol-formaldehyde resin, and others. In any case, the resulting condensation polymer is believed to be formed of units linked together by ether-oxygen linkages and having an average of at least two free or reactive hydroxyl groups per molecule and believed to be terminal in location. The condensation polymer is thermoplastic but its residual hydroxyl groups are believed to function in the cure of these polymers. Amines, alkaline-reacting metal oxides, polycarboxylic acids, polyhydric alcohols and other polyfunctional substances will react with the hydroxyl groups to convert the polymer to the infusible, hard and thermoset condition. Polyamines are the preferred curing agents including the ethylene and polyethylene polyamines such as ethylene diamine, diethylene triamine, triethylene tetramine, and tetraethylene pentamine, intermediate condensation products formed by carefully condensing a polyfunctional amine with an epihalohydrin polymer, for example, a reaction product of diethylene triamine with an epichlorohydrin-"Bisphenol A" polymer, and others. Usually, from 1 to 20% of the polyfunctional curing agent will suffice.

The epichlorohydrin-"Bisphenol A" epoxy polymers are preferred. They are commercially available in a range of molecular weights ranging from those which are liquid or oily at room temperature to those which are solids melting at temperatures of up to 150° C. or more. For ease in mixing with the metallic filaments and other fillers, curing agents, etc., the liquid epichlorohydrin Bisphenol A polymers are preferred. These most preferred polymers may be catalyzed so that they are cold setting, i.e., their cure is spontaneous at room temperature, or may be initiated at moderately low temperatures of 80 to 150° F. Other of these preferred polymers can be compounded so as to require temperatures of up to 300° F. or more for efficient cure. Once the curing reaction has been initiated with the cold setting types, no further heat need be supplied, as will be more fully described below.

The polymerizable polyesters that may be utilized as the binder in this invention are any of the unsaturated polyhydric alcohol polycarboxylic acid polyesters made from unsaturated polycarboxylic acids and/or unsaturated polyhydric alcohols in admixture with a cross-linking monomer such as styrene, diallyl phthalate, triallyl cyanurate, and others, which resins cure without giving off by-products. These resins are to be distinguished from the alkyl type of coating resin which cure by splitting out water or by reaction with oxygen of the air in the presence of driers by reason of drying oil components contained in their molecules. A preferred type of polyester is essentially a condensation product of a dihydric alcohol and a dicarboxylic acid, such as a maleic acid or anhydride, or fumaric acid, polyester of saturated dihydric alcohols such as the ethylene, propylene and butylene glycols, with or without modifying amounts of saturated dicarboxylic acids such as phthalic anhydride, tetrachlorophthalic anhydride, succinic acid, adipic acid, and others.

These preferred polyesters when mixed with a suitable monomer are either liquids or easily meltable solids which are catalyzed with peroxide type catalysts such as benzoyl peroxide, methyl ethyl ketone peroxide, hydroperoxides, metal driers such as cobalt naphthanate, etc., and cure at temperatures ranging from room temperature to 200° C. or more. The maleic and fumaric acid type polyesters are of the same general type as are conventionally employed in fiber glass lamination. Small proportions of trihydric alcohols or tricarboxylic acids, or alcohols and carboxylic acids of higher functionality, may be incorporated in the polyester molecule, if desired.

The method of this invention is carried out by immersing, dipping, spraying, coating or impregnating the metallic filaments with the liquid, or liquefied, resin-catalyst mixture and then placing the resin-impregnated filamentary mass in a suitable mold and compressing at a pressure sufficient to consolidate it into an essentially void-free mass. A vacuum or suction technique may be employed, if desired, to draw a liquid resin through a porous mass of metal filaments. The catalyst is preferably incorporated in the resin before application to the metallic filaments. When using epoxy resins, the strength of the catalyst should be controlled so as to permit sufficient time to properly fill the mold before the generation of heat and setting up of the resin occurs, a minimum of a half hour being preferred. If other fillers, dyes, pigments, stabilizers, etc. are to be added to the binder material, they are also preferably incorporated before the mixture is applied to the filaments. If an epoxy resin, or the polyester resin, together with a high temperature catalyst and the other added ingredients, form a solid or solidifiable binder composition, the binder may be applied hot or from solution and allowed to solidify on the metal filaments. The mass is then warmed slightly in the mold in order to obtain proper flow and initiate the curing reaction.

The molding composition is molded in an appropriate mold for consolidation into a substantially void-free mass. If liquid binder compositions are employed, the mold may be perforated or provided with overflow channels to allow escape of excess liquid material. A suitable mold for this purpose employs a perforated pressure plate with overflow holes in the mold sides on a level with the plate. Of course, a perforated pressure plate or mold is not utilized where it is desired to have higher binder-to-filler ratios. If the resin is of the cold-setting type, the mold simply may be allowed to stand, under pressure, in which case the cure will start spontaneously in the interior of the mass. Under these conditions, the heat of reaction in the interior of the mass quickly builds up to produce a rapid cure. The metallic filamentary filler, due to its continuous character in the matrix, efficiently distributes the heat of reaction and insures a complete reaction over the entire cross section. By the same token, the metallic filaments prevent localized overheating and vaporization of the resinous material in the interior of massive cross sections. At a result, the molded article is remarkably free of defects, voids, distortion, etc. and is dimensionally stable.

If the resin-catalyst system is of the type requiring initial heating to a threshold or initiation temperature before reaction begins, the material may be preheated before inserting in the mold, or the mold warmed to just slightly above the cure initiating temperature. As before, once the reaction begins, the heat of reaction is usually sufficient to complete the cure. The mold in some cases may require heating, as by a heating jacket, or electrical heating elements, in order to insure completion of the curing reaction. Usually ½ to 10 hours, more preferably 1 to 2½ hours, is sufficient to effect a complete cure of even the most massive of molded articles.

The molding pressure, of course, will vary with the stiffness, harshness and flow properties of the molding composition. With the coarser metal filaments, higher molding pressures are required. Usually, however, pressures of 100 to 3,000 lbs./sq. in. will be found sufficient.

The molded article obtained as a product in the method of this invention has a high specific gravity; it has extremely high strength, especially its resistance to impact; it has high thermal conductivity and high electrical conductance; it has a high finish and faithful reproduction of fine mold detail; and it can be drilled, machined, turned, filed, sawed, polished and finished much like a solid metal article, only with greater ease; and it has excellent heat and age resistance. This unusual combination of properties makes the molded composition of this invention unusually well adapted to use as the material of construction for tools and dies for metal and plastic molding and forming operations. The dies, tools, fixtures, etc. can be molded directly from patterns with the elimination of expensive labor and in a shorter time. The high thermal conductivity and heat resistance of the material makes it possible to dissipate the heat generated in metal forming operations. In plastic molding, the material being molded may be heated in contact with the plastic die of this invention, since the heat is evenly distributed and overheating of the die is prevented. Due to its unusually high electrical conductivity, the cured material of this invention has many interesting applications as an electrode material in electrostatic field generation or electronic heating processes.

The invention will now be described with reference to several specific examples which are intended as being illustrative only and not as limiting the scope of the invention.

*Example I*

The female die portion of a punch and die set for use in forming glass fiber impregnated polyester resin parts of an automobile body construction was made from the compositions of this invention in the following manner. The die formed had a cross section of 14" x 14" and was 7" thick. The die cavity of 10" in diameter and a depth of 4" was located in the center of the die cross section. A mold having sides 16" in height and 14" x 14" cross section, referred to, was prepared and the male punch positioned in its center. Ordinary steel wool in the form of unrolled batts having filaments in generally parallel and aligned relationship and having filament diameters in the range of 0.002" to 0.008" were preliminarily dipped in the selected resin and excess resin removed by squeezing. The resin employed was an epoxy resin, known commercially as Rezolin RLF–52–A, an epichlorohydrin-bisphenol A polymer which was catalyzed with a diethylene triamine catalyst. The catalyst strength was such as to produce a pot life of about 45 minutes. The resin was mixed with the catalyst in the ratio of 9 parts of resin to 2 parts of catalyst by weight.

The resin impregnated steel wool was packed into the mold to the top of the 16" sides and a perforated pressure plate applied to the top of the mold. Pressure was slowly applied to the plate to expel the excess resin and compress the filaments to the desired 7" thickness. The mass, under pressure, generated heat and produced a temperature of about 375° F. to 400° F. in the mass to effect a full cure over a two-hour period. The molded die was removed from the mold and inspection revealed the same to be free from cracks, voids or fissures, the surface to be extremely smooth and to have the exact dimensions of the male punch positioned in the mold.

The molded die contained 60% by weight of steel wool filler and was found to be easily machinable, drillable or otherwise mechanically worked. The die was subjected to a temperature of 400° F. continuously for five days, and at the end of this time, there was no evidence of charring, burning or deterioration of any kind. The die was used to form objects from glass fiber filled polyester resins to which a temperature of 250° F. was applied while the polyester was in direct contact with the surface of the die. Extended use of the die for this purpose showed that it was completely satisfactory and no evidence of abrasion or deterioration of the die was detected.

*Example II*

The procedure and basic materials used in Example I were used to form a similar die part with the exception that only 25% by weight of steel wool fibers were employed. This die was subjected to a temperature of 250° F. continuously for five days and at the end of this time showed no evidence of deterioration.

*Example III*

The procedure of Example I was repeated using a quantity of metal filament to produce a die containing 50% by weight of filaments, approximately ⅓ of the filaments being steel wool filaments coated with silver, ⅓ being steel wool filaments coated with copper and ⅓ being plain steel wool filaments. The resin employed was Rezolin L–930 and a sound die of good general appearance was formed having thermal conductivity properties slightly better than the die of Example I.

A disc 3" in diameter and about ¾" thick was severed from a side surface of the above dies and subjected to repeated pounding on a solid surface with a machinists hammer and no cracking, chipping or breakage occurred.

*Example IV*

The epoxy resin of Examples I, II and III was replaced by a mixture of polyester resins designated commercially as "Plaskon 942" and "Plaskon 9600", condensation products of maleic anhydride, phthalic anhydride and ethylene and propylene glycols, in admixture with styrene monomer. The mixture utilized was approximately 70% of the "942" resin and approximately 30% of the "9600" resin, the latter being a so-called resilient polyester. In one example, between 0.75 and 1% of benzoyl peroxide was added as a catalyst and the cure initiation temperature was 225 to 240° F. In another experiment, a "cold-setting" catalyst system consisting of about 0.5% of "Lupersol DDM" (methyl ethyl ketone peroxide) and about .003%, based on the resin, of cobalt as cobalt naphthanate. In both cases, comparable proportions of metallic filaments as used in the above examples were incorporated in the resin and molded in accordance with the procedure as set forth in Example I. The resultant dies were comparable to the corresponding die when epoxy resins were used except that a somewhat higher tolerance for temperature was observed in each case.

Somewhat greater impact tension and shear strengths are obtainable in the articles of this invention when the metallic filaments are disposed in parallel planar relationship in thin sheets and thereafter the thin sheets are assembled or laminated so that the longitudinal axis of the filaments is angularly disposed to that of the filaments in the adjacent layers as illustrated in the drawing. The drawing in exploded form, shows a plurality of sheets 1, 2, 3, each sheet having a plurality of metallic filaments disposed in parallel planar relationship with the longitudinal axis of the filaments of adjacent sheets 1, 2 and 2, 3 being angularly disposed to each other. These sheets are positioned in the mold generally designated 4 and after application of the preliminarily calculated quantity of the desired epoxy or polyester resin 8 has been introduced into the mold cavity with the sheets 1, 2, 3, platen 5 containing a plurality of apertures 7 is lowered into contact with sheet 1 and pressure applied until platen 5 is in contact with the top surface 6 of mold 4. Such articles, and the separate sheets containing parallel aligned unwoven filaments represent preferred embodiments of this invention.

It is to be understood that although the above description of this invention has referred to commercially available metallic filaments, other metallic filaments such as lead and filaments which are not completely metallic are intended to be included. Non-metallic filaments such as glass, plastic or synthetic textile fibers, etc. when plated or coated with a metallic film are examples of other types of filaments intended to be encompassed by this invention.

What is claimed is:

1. The method which comprises mixing a resin selected from the class consisting of glycidyl ethers of polyhydroxy compounds and the unsaturated polymerizable polyhydric alcohol polycarboxylic acid polyesters with a curing agent for said resin and a mass of unwoven metallic filaments, compressing said mass to form a consolidated mass and effecting cure of said consolidated mass under pressure, said filaments being present in an amount sufficient to materially improve the thermal conductivity of the resulting mixture.

2. A method as defined in claim 1 wherein the said resin is a polymerizable glycidyl ether of a polyhydroxy compound.

3. A method as defined in claim 1 wherein the said resin is a polymerizable dihydric alcohol dicarboxylic acid polyester.

4. A method as defined in claim 1 wherein the metallic filaments comprise continuous lengths of unwoven steel filaments.

5. The method which comprises mixing a liquid, thermosetting epichlorohydrin polyhydric phenol resin containing a curing agent for said resin with a mass of unwoven continuous length steel filaments, compressing the resulting mixture to form a consolidated mass and effecting cure of said resin while under compression, said filaments being present in an amount sufficient to materially improve the thermal conductivity of the resulting mixture.

6. A method as defined in claim 5, wherein the resin is a room temperature curing resin and cure is effected by allowing the said consolidated mass to stand at room temperature.

7. A method as claimed in claim 5 wherein the resin is a liquid epichlorohydrin bisphenol A resin and excess liquid resin is allowed to escape from said mass during compression.

8. A plastic molding composition comprising a mass of unwoven continuous length metallic filaments impregnated with a resin selected from the class consisting of glycidyl ethers of polyhydroxy compounds and the unsaturated polymerizable polyhydric alcohol polycarboxylic acid polyesters, said resin containing a suitable catalyst and said filaments being present in an amount sufficient to materially improve the thermal conductivity of the said composition.

9. A plastic molding composition comprising a mass of unwoven continuous length metallic filaments impregnated with a polymerizable glycidyl ether of a polyhydroxy compound containing a suitable catalyst, said composition containing sufficient of said filaments to materially improve the thermal conductivity of said composition.

10. A plastic molding composition comprising a mass of unwoven continuous length metallic filaments impregnated with a polymerizable polyhydric alcohol polycarboxylic acid polyester containing a suitable catalyst, said composition containing a sufficient amount of said filaments to materially improve the thermal conductivity of said composition.

11. A plastic molding composition comprising a mass of unwoven continuous length steel filaments impregnated with a liquid thermosetting epichlorohydrin polyhydric phenol resin containing a suitable catalyst, said composition containing a sufficient amount of said filaments to materially improve the thermal conductivity of said composition.

12. A composition as claimed in claim 10 in which the metallic filaments are of steel and the resin is a peroxide-catalyzed polymerizable dihydric alcohol dicarboxylic acid polyester.

13. A composition as claimed in claim 9 wherein the metallic filaments are of copper.

14. A molded article comprising a thermoset consolidated mass of unwoven continuous length metallic filaments in a matrix derived from the polymerization of a resin selected from the class consisting of glycidyl ethers of polyhydroxy compounds and the unsaturated polymerizable polyhydric alcohol polycarboxylic acid polyesters, said article containing a sufficient quantity of said filaments to materially improve the thermal conductivity of said article.

15. A mold article as claimed in claim 14 wherein the matrix is a thermoset polymer of a glycidyl ether of a polyhydroxy compound.

16. A molded article as claimed in claim 14 wherein the matrix is a polymerized polyhydric alcohol polycarboxylic acid polyester.

17. A molded article as claimed in claim 14 wherein the matrix is a thermoset epichlorohydrin polyhydric phenol resin.

18. A molded article comprising a consolidated mass, having a thickness greater than about ½ inch, of unwoven continuous length steel filaments in a matrix of a thermoset epichlorohydrin polyhydric phenol resin, said filaments being present in an amount sufficient to materially improve the thermal conductivity of said article.

19. A molded article comprising a consolidated mass, having a thickness greater than about ½ inch, of unwoven continuous length steel filaments in a matrix of a polymerized dihydric alcohol dicarboxylic acid polyester, said filaments being present in an amount sufficient to materially improve the thermal conductivity of said article.

20. A mold article comprising a consolidated mass, having a thickness greater than about ½ inch, of unwoven continuous length copper filaments in a matrix of a thermoset epichlorohydrin polyhydric phenol resin, said filaments being present in an amount sufficient to materially improve the thermal conductivity of said article.

21. A molded article as claimed in claim 14 wherein the said metallic filaments are disposed in parallel planar relationship in layers, the longitudinal axis of the filaments in adjacent layers being angularly disposed to each other.

22. A method in accordance with claim 1 wherein said metallic filaments are disposed in parallel planar relationship in layers, the longitudinal axis of the filaments in adjacent layers being angularly disposed to each other.

References Cited in the file of this patent

UNITED STATES PATENTS

| 2,230,127 | Basler | Jan. 28, 1941 |
| 2,419,847 | Mittermaier | Apr. 29, 1947 |
| 2,623,030 | Cordier | Dec. 23, 1952 |

FOREIGN PATENTS

| 361,255 | Germany | Oct. 12, 1922 |

OTHER REFERENCES

Silver et al.: Modern Plastic, volume 28, No. 3, November 1950, pages 113 and 114.

"Handbook of Plastics," by Simonds et al., published January 1949, by Van Nostrand, Co., page 311.